(12) United States Patent
Kim

(10) Patent No.: US 7,387,905 B2
(45) Date of Patent: Jun. 17, 2008

(54) ARRAY SUBSTRATE OF LCD DEVICE HAVING TFT SWITCHING ELEMENT AND METHOD OF FABRICATING THE SAME

(75) Inventor: Heung-Soo Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 94 days.

(21) Appl. No.: 11/582,379

(22) Filed: Oct. 18, 2006

(65) Prior Publication Data

US 2007/0069215 A1    Mar. 29, 2007

Related U.S. Application Data

(62) Division of application No. 10/653,937, filed on Sep. 4, 2003, now Pat. No. 7,130,000.

(30) Foreign Application Priority Data

Oct. 4, 2002    (KR)    .............................. 2002-60706

(51) Int. Cl.
*H01L 27/12* (2006.01)

(52) U.S. Cl. .............................. 438/30; 257/59; 257/72; 257/E27.111; 349/47; 349/141; 349/144

(58) Field of Classification Search .................. 438/30; 257/59, 72, E27.111; 349/42–48, 141, 143, 349/144
See application file for complete search history.

(56) References Cited

U.S. PATENT DOCUMENTS

| 5,032,883 A | 7/1991 | Wakai et al. |
| 5,811,846 A | 9/1998 | Miura et al. |
| 6,069,678 A | 5/2000 | Sakamoto et al. |
| 6,256,076 B1 * | 7/2001 | Bae et al. ...................... 349/38 |
| 6,274,884 B1 * | 8/2001 | Lee et al. ...................... 257/57 |
| 6,671,010 B2 * | 12/2003 | Kwon et al. .................. 349/43 |
| 6,744,482 B2 | 6/2004 | Matsumoto et al. |

FOREIGN PATENT DOCUMENTS

| KR | 1993-0022595 | 11/1993 |
| KR | 2002-0042898 | 6/2002 |

* cited by examiner

*Primary Examiner*—Marcos D. Pizarro
(74) *Attorney, Agent, or Firm*—McKenna, Long & Aldridge LLP

(57) ABSTRACT

An array substrate of a liquid crystal display device includes a substrate, a gate line and a data line on the substrate, the gate line and the data line crossing each other to define a pixel area, a common line parallel to the gate line, a common electrode extending from the common line and including a plurality of vertical portions, a thin film transistor electrically connected to the gate line and the data line, the thin film transistor including a gate electrode connected to the gate line, a semiconductor layer over the gate electrode, a source electrode over the semiconductor layer and connected to the data line, and a drain electrode over the semiconductor layer and spaced apart from the source electrode, wherein a portion of the semiconductor layer partly covers a side of the gate electrode disposed between the data line and the drain electrode, and a pixel electrode in the pixel area, the pixel electrode connected to the drain electrode, and includes a plurality of vertical parts alternating with the plurality of vertical portions of the common electrode.

5 Claims, 9 Drawing Sheets

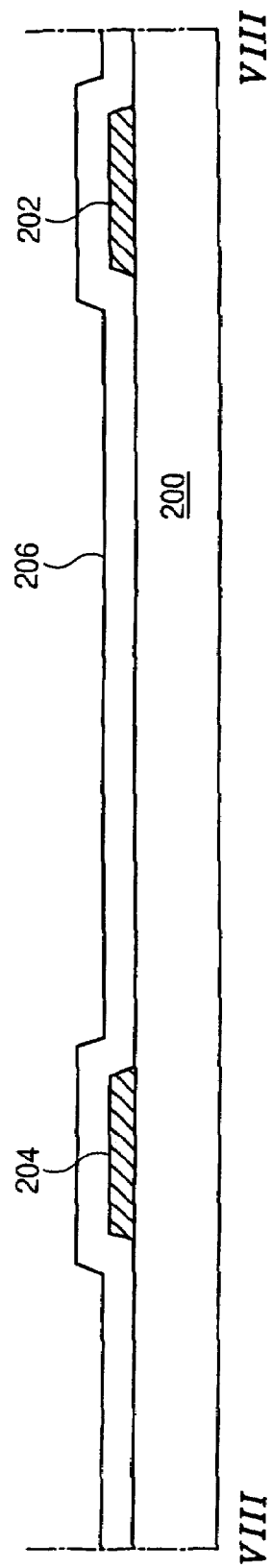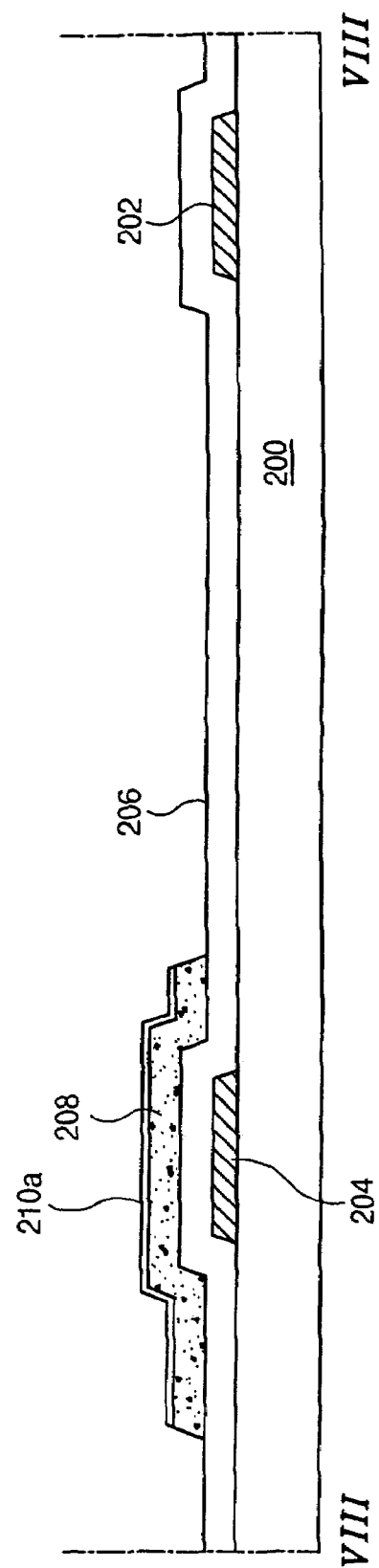

ARRAY SUBSTRATE OF LCD DEVICE HAVING TFT SWITCHING ELEMENT AND METHOD OF FABRICATING THE SAME

This application is a divisional of U.S. application Ser. No. 10/653,937, filed on Sep. 4, 2003, now U.S. Pat. No. 7,130,000 which claims the benefit of Korea Patent Application No. 2002-60706, filed Oct. 4, 2002, which are hereby incorporated by reference for all purposes as if fully set forth herein.

BACKGROUND OF THE INVENTION

1. Field of the Invention

The present invention relates to a liquid crystal display (LCD) device and method of fabricating a liquid crystal display device, and more particularly, to an array substrate of a liquid crystal display device and a method of fabricating an array substrate of a liquid crystal display device.

2. Discussion of the Related Art

In general, liquid crystal display (LCD) devices are driven by making use of optical anisotropy and polarization characteristics of a liquid crystal material. The LCD devices commonly include two substrates that are spaced apart and face each other, and a liquid crystal material layer interposed between the two substrates. Each of the substrates includes electrodes that face each other, wherein a voltage supplied to each electrode induces an electric field perpendicular to the substrates between the electrodes. An alignment of liquid crystal molecules of the liquid crystal material layer is changed by varying an intensity or direction of the applied electric field. Accordingly, the LCD device displays an image by varying light transmittance through the liquid crystal material layer in accordance with the arrangement of the liquid crystal molecules. Thus, the LCD device has superior light transmittance and aperture ratio.

LCD devices that include thin film transistors and matrix configuration of pixel electrodes, which are referred to as an active matrix LCD device, are commonly used because of their high resolution and ability to quickly display moving images. However, the LCD devices are disadvantageous due to their narrow viewing angle. To overcome the narrow viewing angle, an in-plane switching (IPS) LCD device has been developed that implements an electric field that is parallel to surfaces of the substrates.

FIG. 1 is a plan view of an array substrate for an in-plane switching (IPS) liquid crystal display (LCD) device according to the related art. In FIG. 1, a gate line 12 is formed along a first direction on a substrate 10, and a common line 16 is formed along the first direction parallel to the gate line 12. In addition, a data line 24 is formed along a second direction perpendicular to the first direction to cross the gate line 12 and the common line 16. Accordingly, the data line 24 and the gate line 12 define a pixel area P.

A thin film transistor T is formed at the crossing of the gate line 12 and the data line 24 to function as a switching element. The thin film transistor T is composed of a gate electrode 14 that is connected to the gate line 12, a source electrode 26 that is connected to the data line 24, a drain electrode 28 that is spaced apart from the source electrode 26, and a semiconductor layer 20 that is disposed between the gate electrode 12 and the source and drain electrodes 22 and 24. The source electrode 26 may have a U-shape, and may surround a part of the drain electrode 28, which may have a rod shape.

In the pixel area P, a pixel electrode 30 and a common electrode 17 are formed, wherein the pixel electrode 30 is connected to the drain electrode 24 and the common electrode 17 is connected to the common line 16. The pixel electrode 30 is composed of an extension part 30a, a plurality of vertical parts 30b, and a horizontal part 30c. The extension part 30a is connected to the drain electrode 28, and the plurality of vertical parts 30b, which are spaced apart from each other, vertically extend from the extension part 30a. The horizontal part 30c overlaps the common line 16 and is connected to the plurality of vertical parts 30b.

The common electrode 17 includes a horizontal portion 17a and a plurality of vertical portions 17b, wherein the horizontal portion 17a overlaps the extension part 30a of the pixel electrode 30. The plurality of vertical portions 17b vertically extend from the common line 16 and are alternately arranged with the plurality of vertical parts 30b of the pixel electrode 30. The plurality of vertical portions 17b are connected to the horizontal portion 17a of the common electrode 17.

The common line 16 and the horizontal part 30c of the pixel electrode 30 form a storage capacitor C that is parallel to a liquid crystal capacitor. Accordingly, the common line 16 functions as a first storage electrode and the horizontal part 30c functions as a second storage electrode. However, as shown in FIG. 1, the data line 24 and the drain electrode 28 may become electrically shorted together.

FIG. 2 is an enlarged plan view of region "A" of FIG. 1 according to the related art. In FIG. 2, the source electrode 26 extends from the data line 24 and is disposed over and along a first side of the gate electrode 14. Similarly, the drain electrode 28 is disposed over the gate electrode 14 along a second side of the gate electrode 14. Accordingly, the source electrode 26 has a U-shape, and the drain electrode 28 that extends over the gate electrode 14 has a rod shape that is surrounded by the source electrode 26.

During a patterning process of the data line 24, the source electrode 26, and the drain electrode 28, a residuary layer 50 may remain along a stepped portion of the gate electrode 14 located between the data line 24 and the drain electrode 28. Accordingly, the data line 24 and the drain electrode 28 may become electrically shorted together when a voltage is supplied to the LCD device. Thus, driving the LCD device may be problematic due to the electrical short circuit of the data line 24 and the drain electrode 28.

To solve these problems, the semiconductor layer 20 has been formed to have an enlarged area formed over the gate electrode 14 in an area where the data line 24 and the drain electrode 28 may electrically short circuit. However, a position of the semiconductor layer 20 may be shifted during formation processes of the semiconductor layer 20 such that the data line 24 and the drain electrode 28 may still become electrically short circuited.

SUMMARY OF THE INVENTION

Accordingly, the present invention is directed to an array substrate of a liquid crystal display device and a method of fabricating an array substrate of a liquid crystal display device that substantially obviates one or more of the problems due to limitations and disadvantages of the related art.

An object of the present invention is to provide an array substrate of a liquid crystal display device having an improved structure to prevent electrical short circuiting between a drain electrode and a data line.

Another object of the present invention is to provide a method of fabricating an array substrate of a liquid crystal display device to prevent electrical short circuiting between a drain electrode and a data line.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate of a liquid crystal display device includes a substrate, a gate line and a data line on the substrate, the gate line and the data line crossing each other to define a pixel area, a common line parallel to the gate line, a common electrode extending from the common line and including a plurality of vertical portions, a thin film transistor electrically connected to the gate line and the data line, the thin film transistor including a gate electrode connected to the gate line, a semiconductor layer over the gate electrode, a source electrode over the semiconductor layer and connected to the data line, and a drain electrode over the semiconductor layer and spaced apart from the source electrode, wherein a portion of the semiconductor layer partly covers a side of the gate electrode disposed between the data line and the drain electrode, and a pixel electrode in the pixel area, the pixel electrode connected to the drain electrode, and includes a plurality of vertical parts alternating with the plurality of vertical portions of the common electrode.

In another aspect, an array substrate for a liquid crystal display device includes a substrate, a gate line and a data line on the substrate, the gate line and the data line crossing each other to define a pixel area, a thin film transistor electrically connected to the gate and data line, the thin film transistor including a gate electrode connected to the gate line, a semiconductor layer over the gate electrode, a source electrode over the semiconductor layer and connected to the data line, and a drain electrode over the semiconductor layer and spaced apart from the source electrode, wherein a portion of the semiconductor layer partly covers a side of the gate electrode disposed between the data line and the drain electrode, and a pixel electrode in the pixel area, the pixel electrode connected to the drain electrode.

In another aspect, a method of fabricating an array substrate of a liquid crystal display device includes forming a gate line and a gate electrode on a substrate, forming a common line and a common electrode on the substrate, the common line is parallel to the gate line and the common electrode extends from the common line and includes a plurality of vertical portions, forming a gate insulating layer on the gate line, the gate electrode, the common line, and the common electrode, forming a semiconductor layer on the gate insulating layer over the gate electrode, forming a data line, a source electrode, and a drain electrode on the semiconductor layer, the data line crosses the gate line to define a pixel area, the source electrode is disposed over the gate electrode and is connected to the data line, and the drain electrode is spacing apart from the source electrode, forming a pixel electrode in the pixel area, the pixel electrode is connected to the drain electrode and includes a plurality of vertical parts alternating with the plurality of vertical portions of the common electrode, and forming a passivation layer on the pixel electrode, wherein a portion of the semiconductor layer partly covers a side of the gate electrode disposed between the data line and the drain electrode.

In another aspect, a method of fabricating an array substrate of a liquid crystal display device includes forming a gate line and a gate electrode on a substrate, forming a gate insulating layer on the gate line and the gate electrode, forming a semiconductor layer on the gate insulating layer over the gate electrode, forming a data line, a source electrode, and a drain electrode on the semiconductor layer, the data line crosses the gate line to define a pixel area, the source electrode is disposed over the gate electrode and is connected to the data line, and the drain electrode is spaced apart from the source electrode, forming a passivation layer on the pixel electrode, and forming a pixel electrode in the pixel area, the pixel electrode connected to the drain electrode, wherein a portion of the semiconductor layer partly covers a side of the gate electrode disposed between the data line and the drain electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 8A to 8C are cross sectional views along VIII-VIII of FIG. 7 of another exemplary method of fabricating an array substrate for an LCD device according to the present invention.

DETAILED DESCRIPTION OF THE PREFERRED EMBODIMENTS

Reference will now be made in detail to the illustrated embodiments of the present invention, which are illustrated in the accompanying drawings.

Figure 3:
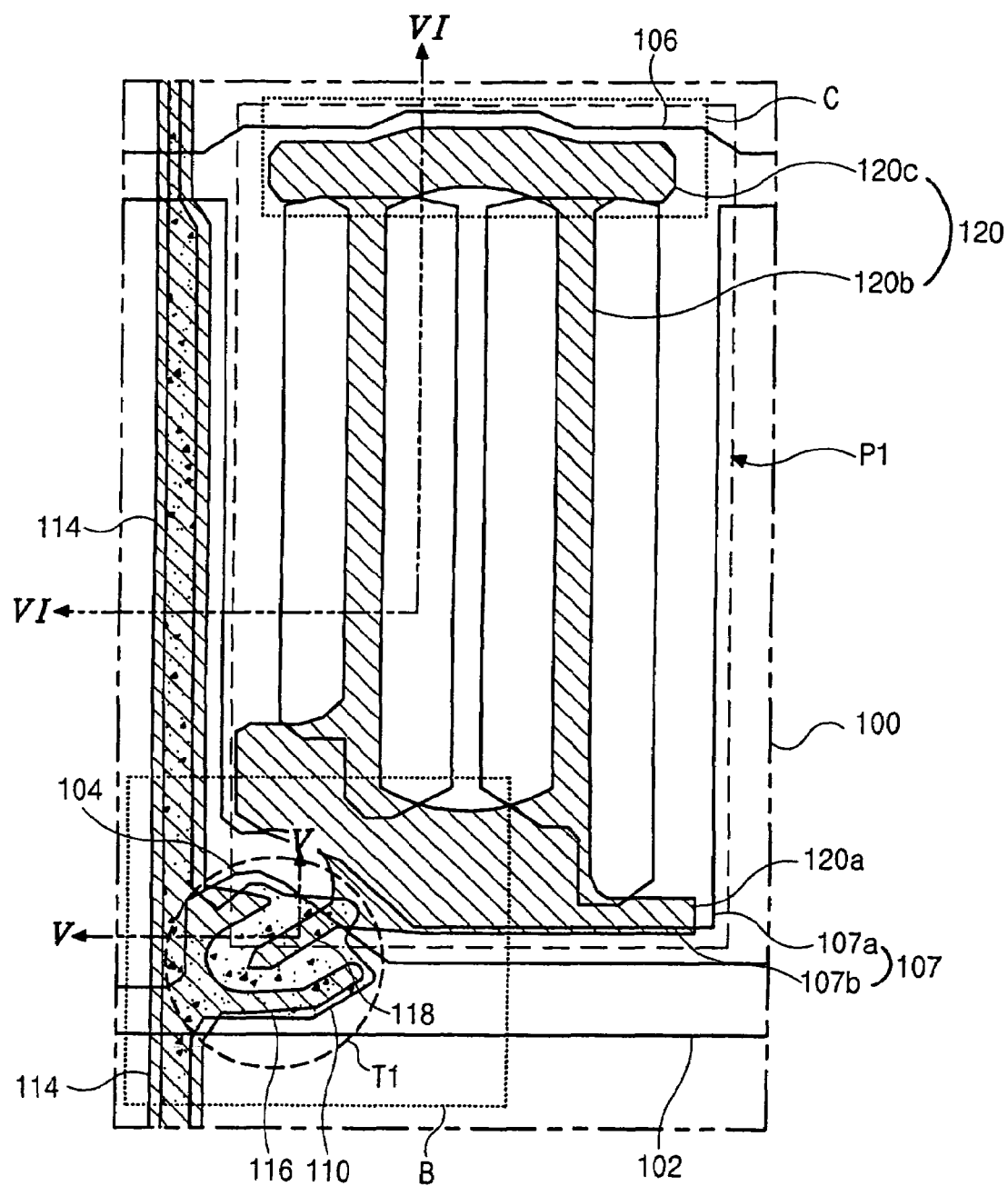
FIG. 3 is a plan view of an exemplary array substrate for an IPS LCD device according to the present invention.

FIG. 3 is a plan view of an exemplary array substrate for an IPS LCD device according to the present invention. In FIG. 3, a gate line 102 may be formed along a first direction on a substrate 100, and a common line 106 may be formed along the first direction parallel to the gate line 102 on the substrate 100. In addition, a data line 114 may be formed on the substrate 100 along a second direction perpendicular to the first direction to cross the gate line 102 and the common line 106, wherein the data line 114 and the gate line 102 may define a pixel area P1.

A thin film transistor T1 may be formed at the crossing of the gate and data lines 102 and 114 to function as a switching element. The thin film transistor T1 may include a gate electrode 104 that may be connected to the gate line 102, a source electrode 116 that may be connected to the data line 114, a drain electrode 118 that may be spaced apart from the source electrode 114, and a semiconductor layer 110 between the gate electrode 104 and the source and drain electrodes 116 and 118.

In the pixel area P1, a pixel electrode 120 and a common electrode 107 may be formed, wherein the common electrode 107 may include a plurality of vertical portions 107a and a horizontal portion 107b. First end portions of the vertical portions 107a may be connected to the common line 106, and second end portions of the vertical portions 107a may be connected to the horizontal portion 107b.

The pixel electrode 120 may include an extension part 120a, a plurality of vertical parts 120b, and a horizontal part 120c. The extension part 120a may extend from the drain electrode 118, and may overlap the horizontal portion 107b of the common electrode 107. The plurality of vertical parts 120b may be alternatingly arranged with the plurality of vertical portions 107a of the common electrode 107. First end portions of the vertical parts 120b may be connected to the extension part 120a of the pixel electrode 120, and second end portions of the vertical parts 120b may be connected to the horizontal part 120c of the pixel electrode 120. The horizontal part 120c of the pixel electrode 120 may overlap the common line 106, thereby forming a storage capacitor C.

In the array substrate, the source electrode 116 may have a U-shape, and the drain electrode 118 may have a rod shape that may be surrounded by the source electrode 116. Accordingly, a channel of the thin film transistor T1, which corresponds to the semiconductor layer 110 between the source electrode 116 and the drain electrode 118, may also have a U-shape. Since a length of the channel decreases and a width of the channel increases, current flowing through the channel may increase.

Figure 1:
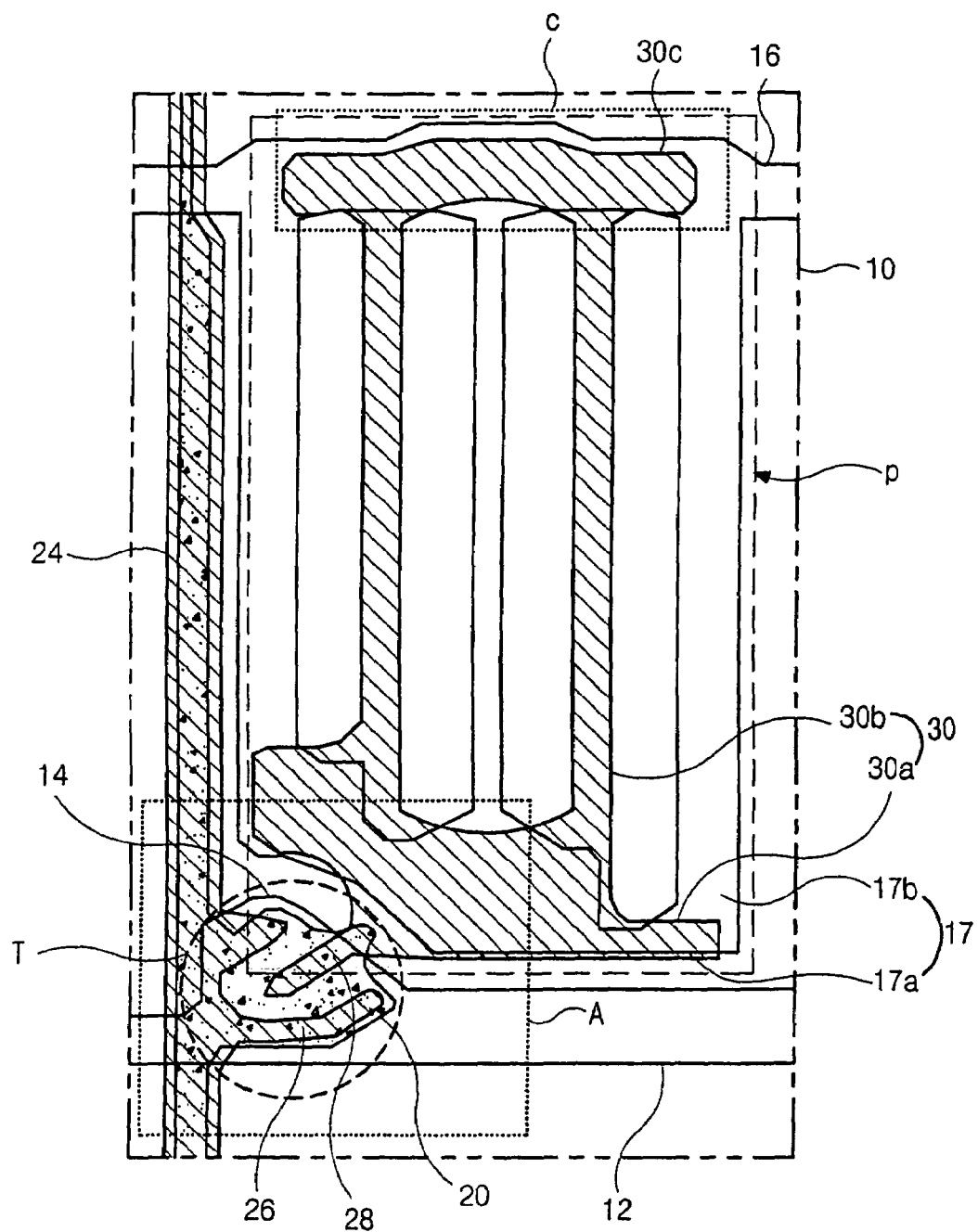
FIG. 1 is a plan view of an array substrate for an in-plane switching (IPS) liquid crystal display (LCD) device according to the related art.
Figure 2:
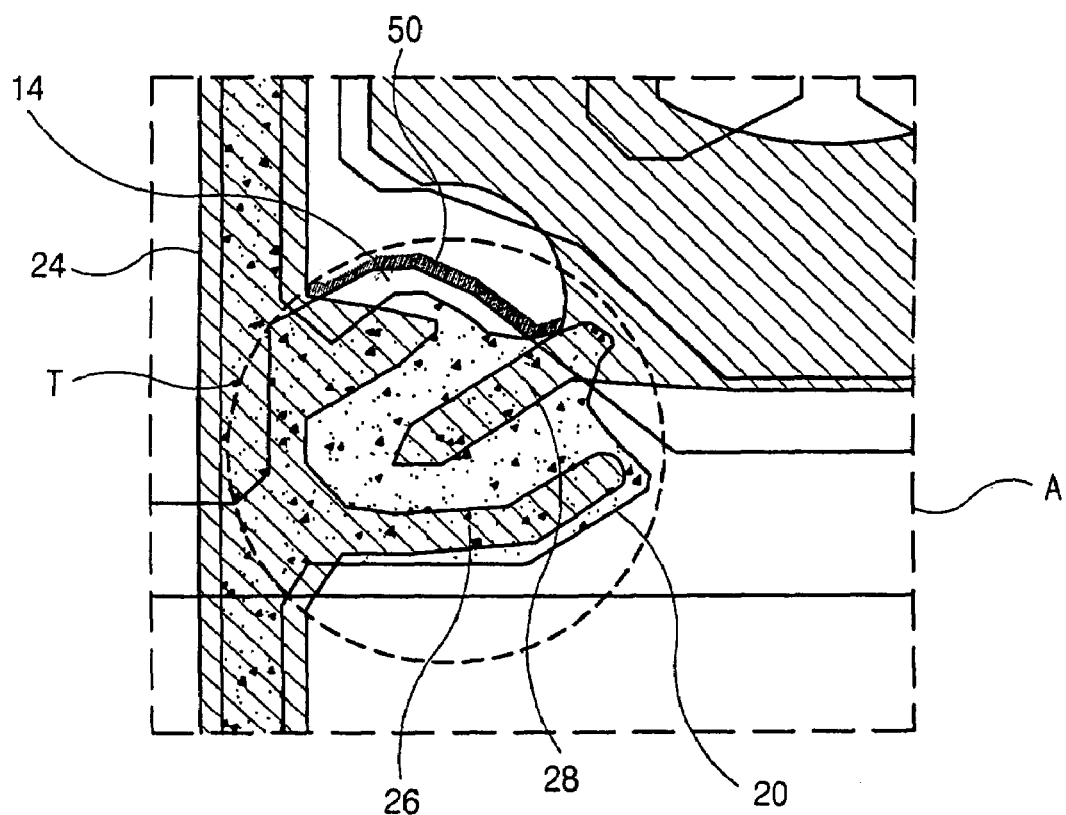
FIG. 2 is an enlarged plan view of region "A" of FIG. 1 according to the related art.

For example, as compared with FIG. 1, the semiconductor layer 110 may extend about 2 µm to about 3 µm toward a side of the gate electrode 104 between the data line 114 and the drain electrode 118. Accordingly, the semiconductor layer 110 may partly cover a side of the gate electrode 104 between the data line 114 and the drain electrode 118.

Figure 4:
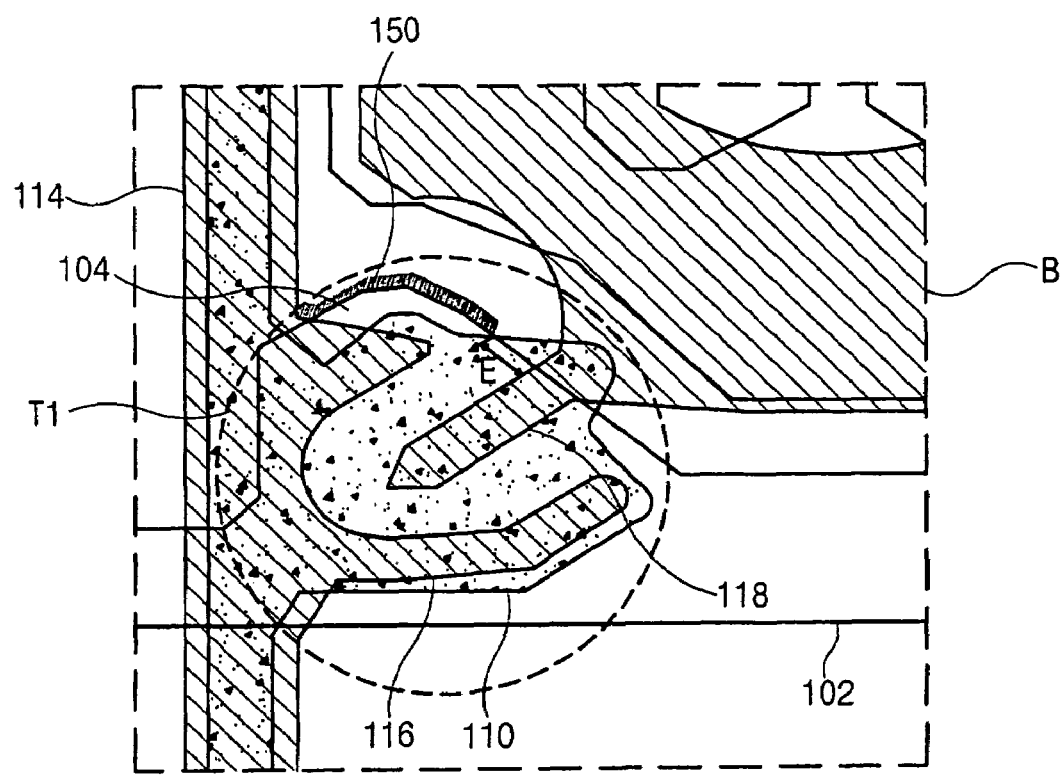
FIG. 4 is an enlarged plan view of region "B" of FIG. 3 according to the related art.

FIG. 4 is an enlarged plan view of region "B" of FIG. 3 according to the related art. In FIG. 4, the semiconductor layer 110, which may be disposed between the gate electrode 104 and the source and drain electrodes 116 and 118, may have a length E within a range of about 2 µm to about 3 µm that extends along the side of the gate electrode 104 from the crossing point of the gate electrode 104 and the drain electrode 118, and may cover the side of the gate electrode 104. For example, the length E may be about 1.8 µm, which is the maximum value of aligning margins of a mask in a photolithography process for patterning the semiconductor layer 110. Although the maximum aligning margin of the mask may be about 1.8 µm, the semiconductor layer 110 may cover the side of the gate electrode 104 that is exposed between the data line 114 and the drain electrode 118.

Thus, a residuary layer 150, which may be formed along the side of the gate electrode 104 during a patterning process of the data line 114, the source electrode 115, and the drain electrode 118 due to a stepped portion of the gate electrode 104, may be electrically disconnected form the drain electrode 118 by the semiconductor layer 110. Accordingly, the data line 114 and the drain electrode 118 may be prevented from being electrically short circuited.

Figure 5A:
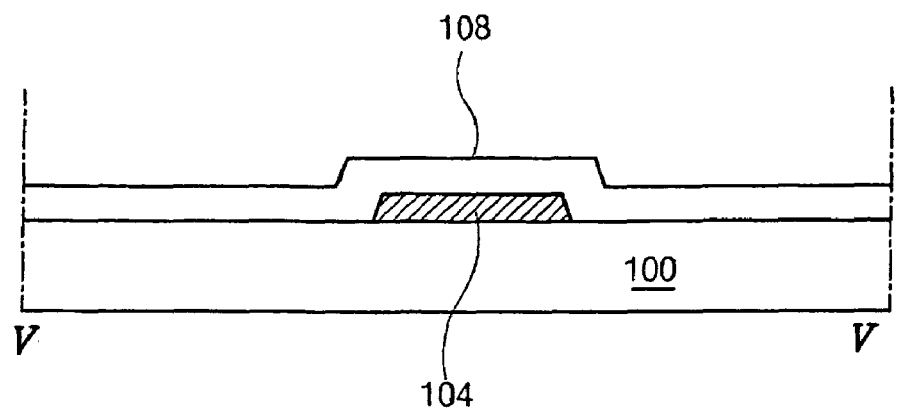
FIGS. 5A to 5C are cross sectional views along V-V of FIG. 3 of an exemplay method of fabricating an array substrate for an IPS LCD device according to the present invention.
Figure 5B:
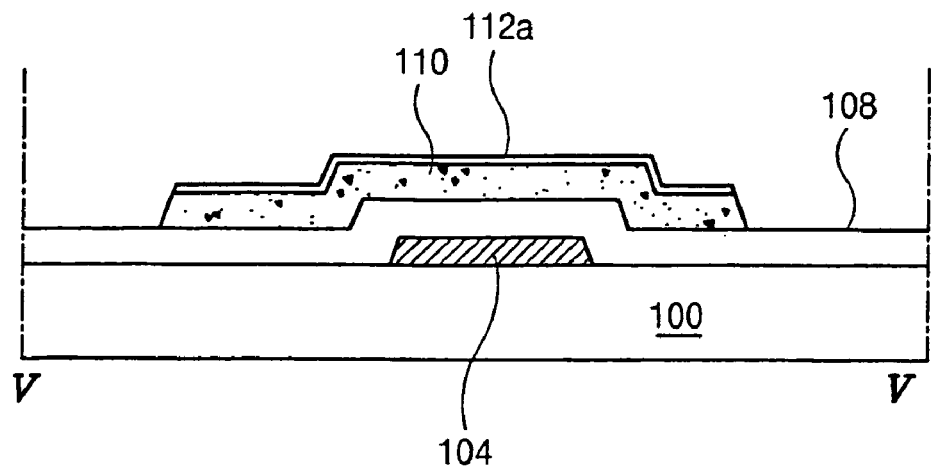
Figure 5C:
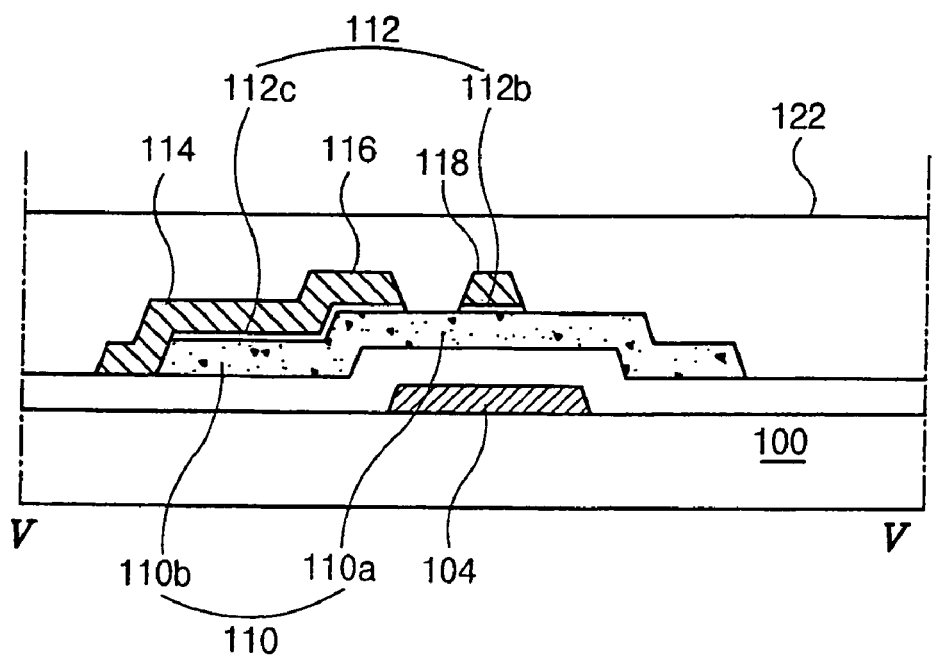
Figure 6A:
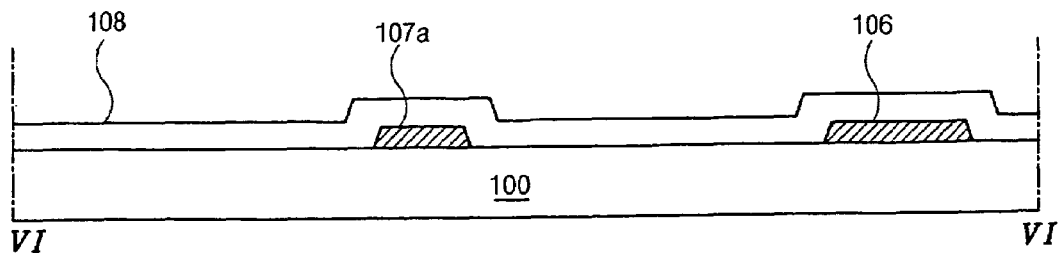
FIGS. 6A to 6C are cross sectional views along VI-VI of FIG. 3 of another exemplary method of fabricating an array substrate for an IPS LCD device according to the present invention.
Figure 6B:
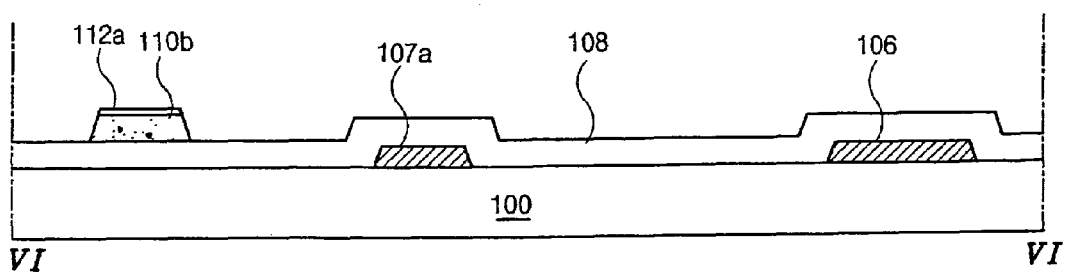
Figure 6C:
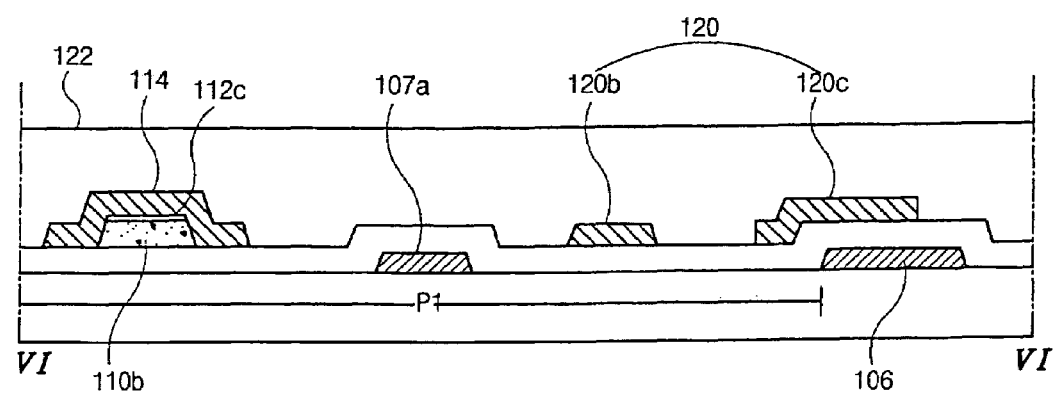

FIGS. 5A to 5C are cross sectional views along V-V of FIG. 3 of an exemplay method of fabricating an array substrate for an IPS LCD device according to the present invention, and FIGS. 6A to 6C are cross sectional views along VI-VI of FIG. 3 of another exemplary method of fabricating an array substrate for an IPS LCD device according to the present invention. In FIGS. 5A and 6A, a gate line 102 (in FIG. 3), a gate electrode 104, and a common line 106 may be formed on a substrate 100 by depositing and patterning a first metal layer. For example, the first metal layer may include metal material(s), such as aluminum (Al), an aluminum alloy of aluminum and neodymium (Nd), molybdenum (Mo), tungsten (W), and chromium (Cr). The gate line 102 (in FIG. 3), the gate electrode 104 and the common line 106 may be formed of a double layer structure using aluminum or an aluminum alloy and molybdenum or chromium.

In addition, a common electrode, which may include a plurality of vertical portions 107a and a horizontal portion 107b (in FIG. 3) may be formed. Accordingly, the common line 106 may be formed parallel to the gate line 102 (in FIG. 3), and the plurality of vertical portions 107a may be connected to the common line 106 and the horizontal portion 107b (in FIG. 3).

Then, a gate insulating layer 108 may be formed on the substrate 100 to cover the gate line 102 (in FIG. 3) and the gate electrode 104 by depositing an inorganic insulating material, such as silicon nitride (SiNx) and silicon oxide (SiO$_2$).

In FIGS. 5B and 6B, a semiconductor layer 110 and a doped semiconductor layer 112a subsequently may be formed on the gate insulating layer 108. The semiconductor layer 110 may include amorphous silicon, and the doped semiconductor layer 112a may include doped amorphous silicon.

In FIGS. 5C and 6C, a data line 114, a source electrode 116, and a drain electrode 118 may be formed by depositing and patterning a second metal layer. The second metal layer may include the metal material(s) used to form the gate line 102 (in FIG. 3), the gate electrode 104, and the common line 106. The data line 114 may be formed to cross the gate line 102 (in FIG. 3) to define a pixel area P1. In addition, the source electrode 116 may be connected to the data line 114, and the drain electrode 118 may be spaced apart from the source electrode 116 over the gate electrode 104.

Then, a pixel electrode 120 may be formed in the pixel area P1. The pixel electrode 120 may include an extension part 120a (in FIG. 3) that may extend from the drain electrode 118, a plurality of vertical parts 120b that may be connected to the extension part 120a (in FIG. 3) alternating with the vertical portions 107a of the common electrode 107, and a horizontal part 120c that may be connected to the plurality of vertical parts 120b.

Next, portions of the doped semiconductor layer 112a (in FIG. 5B) may be exposed when portions of the source and drain electrodes 116 and 118 are removed, thereby forming an ohmic contact layer 112. Accordingly, the semiconductor layer 110 may include an active layer 110a over the gate electrode 104 and an extension portion 110b under data line 114. The ohmic contact layer 112 may include a first portion 112b corresponding to the drain electrode 118 and a second portion 112c corresponding to the data line 114 and the source electrode 116. The extension portion 110b of the semiconductor layer 110 may improve deposition properties of the data line 114 with the second portion 112c of the ohmic contact layer 112.

Although not shown, the source electrode 116 may have a U-shape, and the drain electrode 118 may have a rod shape that may be surrounded by the source electrode 116. Accordingly, the semiconductor layer 110 may cover a side of the gate electrode 104 disposed between the data line 114 and the drain electrode 118. For example, a length of the semiconductor layer 110 covering the side of the gate electrode 104 from the crossing point of the gate electrode 104 and the drain electrode 118 may be within a range of about 2 μm to about 3 μm.

Next, a passivation layer 122 may be formed on the substrate 100 to cover the pixel electrode 120 by coating transparent organic material(s), such as benzocyclobutene (BCB) and an acrylic resin.

According to the present invention, since the semiconductor layer 110 covers the side of the gate electrode 104 between the data line 114 and the drain electrode 118, a residuary layer does not electrically contact the drain electrode 118. Thus, the data line 114 and the drain electrode 118 may be prevented from being electrically short circuited.

Figure 7:
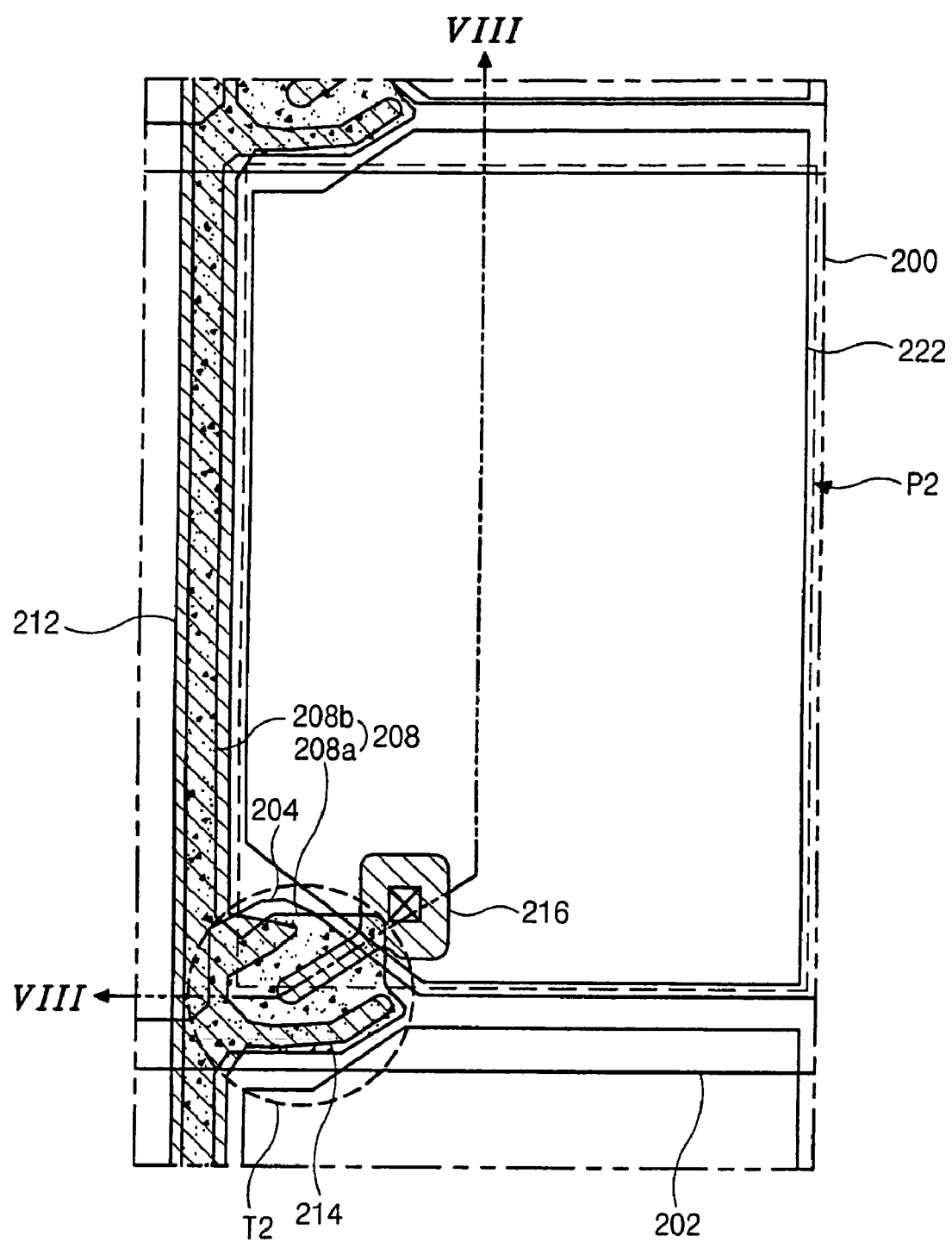
FIG. 7 is a plan view of another exemplary array substrate for a liquid crystal display (LCD) device according to the present invention.

FIG. 7 is a plan view of another exemplary array substrate for a liquid crystal display (LCD) device according to the present invention. In FIG. 7, a gate line 202 may be formed along a first direction on a substrate 200, and a data line 212 may be formed on the substrate 200 along a second direction perpendicular to the first direction to cross the gate line 202, thereby defining a pixel area P2.

A thin film transistor T2 may be formed at the crossing of the gate and data lines 202 and 212 to function as a switching element. The thin film transistor T2 may include a gate electrode 204 that may be connected to the gate line 202, a source electrode 214 that may be connected to the data line 212, a drain electrode 216 that may be spaced apart from the source electrode 214, and a semiconductor layer 208 between the gate electrode 204 and the source and drain electrodes 214 and 216.

In addition, a pixel electrode 222 may be formed in the pixel area P2. The pixel electrode 222 may include transparent conducting material(s) and may be connected to the drain electrode 216. Accordingly, the pixel electrode 222 may overlap the gate line 202 to form a storage capacitor.

In FIG. 7, the source electrode 214 may have a U-shape, and the drain electrode 216 may have a portion having a rod shape that may be surrounded by the source electrode 214. Thus, a channel of the thin film transistor T2 may also have a U-shape. Since a length of the channel decreases and a width of the channel increases due to the U-shape, current flow through the channel may increase.

In FIG. 7, the semiconductor layer 208 may extend along a side of the gate electrode 204 between the data line 212 and the drain electrode 216 from the crossing point of the gate electrode 204 and the drain electrode 216. Accordingly, the semiconductor layer 208 may cover the side of the gate electrode 204 by about 2 μm to about 3 μm from the crossing point of the gate electrode 204 and the drain electrode 216.

Figure 8C:
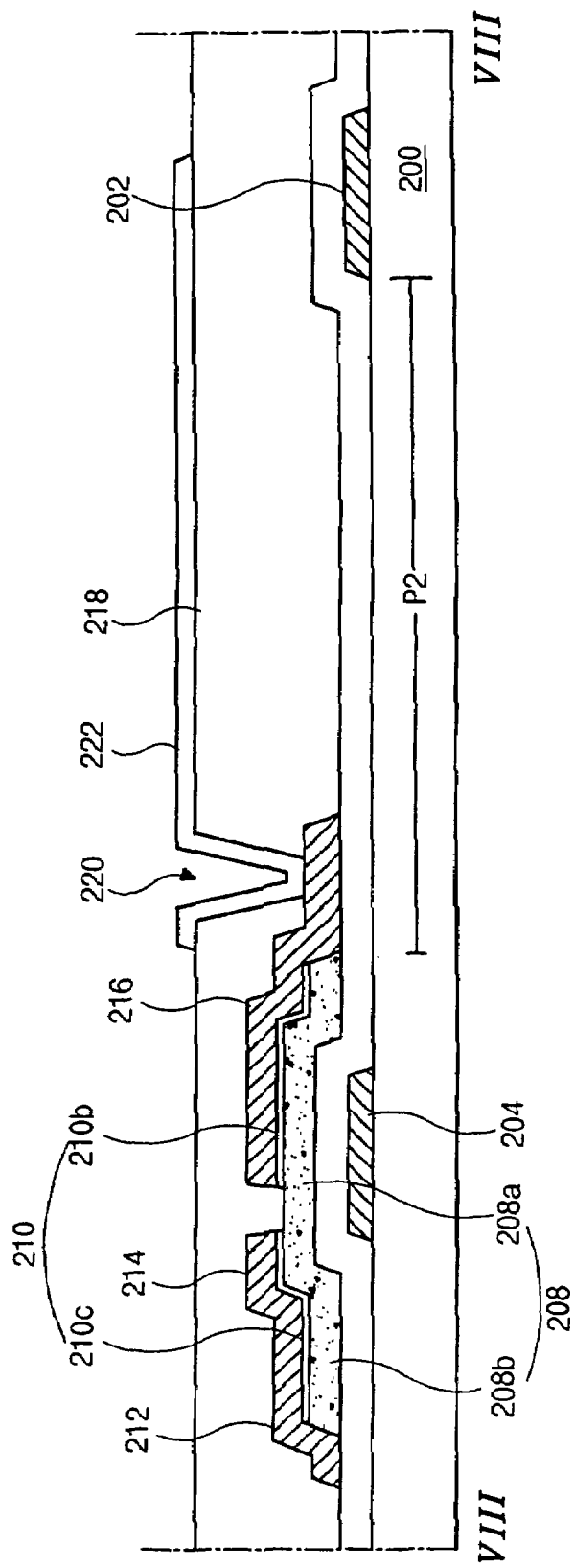

FIGS. 8A to 8C are cross sectional views along VIII-VIII of FIG. 7 of another exemplary method of fabricating an array substrate for an LCD device according to the present invention. In FIG. 8A, a gate line 202 and a gate electrode 204 may be formed on a substrate 200 by depositing and patterning a first metal layer. The first metal layer may include metal material(s), such as aluminum (Al), an aluminum alloy of aluminum and neodymium (Nd), molybdenum (Mo), tungsten (W), and chromium (Cr). The gate line 202 and the gate electrode 204 may be formed of a double layer including aluminum or an aluminum alloy and molybdenum or chromium.

Next, a gate insulating layer 206 may be formed on the substrate 200 to cover the gate line 202 and the gate electrode 204 by depositing inorganic insulating material(s), such as silicon nitride (SiNx) and silicon oxide (SiO$_2$).

In FIG. 8B, a semiconductor layer 208 and a doped semiconductor layer 210a may be subsequently formed on the gate insulating layer 206. The semiconductor layer 208 may include amorphous silicon, and the doped semiconductor layer 210a may include doped amorphous silicon.

In FIG. 8C, a data line 212, a source electrode 214, and a drain electrode 216 may be formed by depositing and patterning a second metal layer. The second metal layer may include the metal material(s) used to form the gate line 202 and the gate electrode 204. The data line 212 may cross the gate line 202 to define a pixel area P2. In addition, the source electrode 214 may be connected to the data line 212, and the drain electrode 216 may be spaced apart from the source electrode 214 over the gate electrode 204. Although not shown, the source electrode 214 may have a U-shape and may surround a portion of the drain electrode 216, which may have a rod shape.

Next, an exposed portion of the doped semiconductor layer 210a (in FIG. 8B) between the source and drain electrodes 214 and 216 may be removed, thereby forming an ohmic contact layer 210. The semiconductor layer 208 may include an active layer 208a over the gate electrode 204 and an extension portion 208b under data line 212. The ohmic contact layer 210 may include a first portion 210b corresponding to the drain electrode 216 and a second portion 210c corresponding to the data line 212 and the source electrode 214. The extension portion 208b of the semiconductor layer 208 may improve deposition properties of the data line 212 with the second portion 210c of the ohmic contact layer 210.

Then, a passivation layer 218 may be formed on the substrate 200 to cover the data line 212, the source electrode 214, and the drain electrode 216 by coating transparent organic material(s), such as benzocyclobutene (BCB) and an acrylic resin. Next, the passivation layer 218 may be patterned, thereby forming a drain contact hole 220 that exposes a portion of the drain electrode 216.

Next, a pixel electrode 222 may be formed in the pixel area P2 on the passivation layer 218 by depositing and patterning transparent conducting material(s), such as indium-tin-oxide (ITO) and indium-zinc-oxide (IZO). The pixel electrode 222 may be connected to the drain electrode 216 through the drain contact hole 220.

According to the present invention, since the semiconductor layer covers the side of the gate electrode disposed between the data line and the drain electrode, a residuary layer may be prevented from forming along the side of the gate electrode between the data line and the drain electrode. Accordingly, the data line and the drain electrode may be prevented from electrically short circuiting. In addition, image quality of the LCD device may be improved, and productivity may be increased.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A method of fabricating an array substrate of a liquid crystal display device, comprising:

forming a gate line and a gate electrode on a substrate;

forming a common line and a common electrode on the substrate, the common line is parallel to the gate line and the common electrode extends from the common line and includes a plurality of vertical portions;

forming a gate insulating layer on the gate line, the gate electrode, the common line, and the common electrode;

forming a semiconductor layer on the gate insulating layer over the gate electrode;

forming a data line, a source electrode, and a drain electrode on the semiconductor layer, the data line crosses the gate line to define a pixel area, the source electrode is disposed over the gate electrode and is connected to the data line, and the drain electrode is spacing apart from the source electrode;

forming a pixel electrode in the pixel area, the pixel electrode is connected to the drain electrode and includes a plurality of vertical parts alternating with the plurality of vertical portions of the common electrode; and forming a passivation layer on the pixel electrode, wherein a portion of the semiconductor layer partly covers a side of the gate electrode disposed between the data line and the drain electrode, and wherein the portion of the semiconductor layer partly covering the side of the gate electrode has a length within a range of about 2 μm to about 3 μm from a crossing point of the gate electrode and the drain electrode alone the side of the gate electrode.

2. The method according to claim 1, wherein a thin film transistor has a U-shaped channel that corresponds to the semiconductor layer between the source electrode and the drain electrode.

3. The method according to claim 1, wherein the step of forming the common line and the common electrode is simultaneously performed with the step of forming the gate line and the gate electrode.

4. The method according to claim 1, wherein the step of forming the pixel electrode is simultaneously performed with the step of forming the data line, the source electrode, and the drain electrode.

5. A method of fabricating an array substrate of a liquid crystal display device, comprising:

forming a gate line and a gate electrode on a substrate;

forming a gate insulating layer on the gate line and the gate electrode;

forming a semiconductor layer on the gate insulating layer over the gate electrode;

forming a data line, a source electrode, and a drain electrode on the semiconductor layer, the data line crosses the gate line to define a pixel area, the source electrode is disposed over the gate electrode and is connected to the data line, and the drain electrode is spaced apart from the source electrode;

forming a passivation layer on a pixel electrode; and forming the pixel electrode in the pixel area, the pixel electrode connected to the drain electrode, wherein a portion of the semiconductor layer partly covers a side of the gate electrode disposed between the data line and the drain electrode, and wherein the portion of the semiconductor layer partly covering the side of the gate electrode has a length within a range of about 2 μm to about 3 μm from a crossing point of the gate electrode and the drain electrode along the side of the gate electrode.

* * * * *